US008005699B2

(12) United States Patent
Fischer et al.

(10) Patent No.: US 8,005,699 B2
(45) Date of Patent: Aug. 23, 2011

(54) VALUE CHAIN MANAGEMENT (75) Inventors: David J. Fischer, Coppell, TX (US); Geoffrey M. Squires, Highland Village, TX (US); Rakesh Sharma, San Jose, CA (US); Ramnath Ganesan, Flower Mound, TX (US); Deepak M. Ghodke, Irving, TX (US); Bharadwaj Rangarajan, Irving, TX (US)

(73) Assignee: JDA Software Group, Inc., Scottsdale, AZ (US)

( * ) Notice: Subject to any disclaimer, the term of this patent is extended or adjusted under 35 U.S.C. 154(b) by 927 days.

(21) Appl. No.: 11/779,126

(22) Filed: Jul. 17, 2007

(65) Prior Publication Data
US 2008/0015915 A1    Jan. 17, 2008

Related U.S. Application Data (62) Division of application No. 09/941,960, filed on Aug. 28, 2001, now Pat. No. 7,349,861.

(60) Provisional application No. 60/231,650, filed on Sep. 11, 2000.

(51) Int. Cl.
*G06F 7/11* (2006.01)
(52) U.S. Cl. .......................................................... 705/7
(58) Field of Classification Search .................... 705/7
See application file for complete search history.

(56) References Cited

U.S. PATENT DOCUMENTS

| 5,321,605 A | 6/1994 | Chapman et al. |
|---|---|---|
| 5,787,283 A | 7/1998 | Chin et al. |
| 5,953,707 A | 9/1999 | Huang et al. |
| 5,983,194 A | 11/1999 | Hogge et al. |
| 6,049,742 A | 4/2000 | Milne et al. |
| 6,101,479 A | 8/2000 | Shaw |
| 6,567,783 B1 | 5/2003 | Notani et al. |
| 6,889,197 B2 | 5/2005 | Lidow |
| 7,003,474 B2 | 2/2006 | Lidow |
| 7,039,597 B1 * | 5/2006 | Notani et al. .............. 705/9 |
| 2002/0016759 A1 | 2/2002 | Macready et al. |
| 2002/0049622 A1 | 4/2002 | Lettich et al. |
| 2002/0188486 A1 * | 12/2002 | Gil et al. ..................... 705/7 |

FOREIGN PATENT DOCUMENTS
WO    WO 0051038 A1 *  8/2000

OTHER PUBLICATIONS

White "The Value Equation: Value Chain Management, Collaboration and the Internet", 1999, Logility, Inc, pp. 1-10.*

(Continued)

*Primary Examiner* — Romain Jeanty
(74) *Attorney, Agent, or Firm* — Booth Udall, PLC; Steven J. Laureanti

(57) ABSTRACT

A system (10) for managing a value chain includes a planning application (36) that receives planning data from a number of entities included in a value chain and automatically generates a plan according to the planning data. At least two of the entities do not directly communicate planning data to one another. The system (10) also includes a manager application (44) that receives the plan and automatically identifies one or more exceptions in the plan, communicates planning data relating to the exceptions to one or more of the entities, receives instructions from one or more of the entities regarding how the exceptions are to resolved, and automatically modifies the planning data in response to the instructions.

20 Claims, 3 Drawing Sheets

OTHER PUBLICATIONS

Olhager et al "Production planning and control tools", 2000, Production planning and control, vol. II, pp. 1-13.*
Reid et al "An Integrated Management Model for Virtual Enterprises: Vision, Strategy and Structure", Dec. 1996, IEEE, pp. 522-527.*
Dialog "Logility Integrates With PeopleSoft to Win Smead Logility PLanning and Forecasting to Complement PeopleSoft Enterprise Applications for Office Filing Systems Manufacturer"; Oct. 1997; PR Newswire; pg. 1009ATTH011.
Walters et al., "Value and information—concept and issues for management"; Dec. 1999; Management Decision; London; vol. 37 Iss. 8; p. 643.
Lapide; "Supply Chain Planning Optimization: Just the Facts"; May 1998; Frontline; pp. 1-24.
Dialog "Badcock Furnishes the Future with Logility"; Feb. 1999; PR Newswire, 97144; Dialog file 16; Accession No. 06152677.
Industry Directions "The Next Wave of Supply Chain Advantage: Collaborative Planning, Forecasting and Replenishment"; Apr. 2000; Industry Directions, Inc., pp. 1-16.
Trombly, "Value-Chain Management"; May 2000; Computerworld; pp. 1-5.
Dialog "Steel Lima Goes Live with J.D. Edwards B2B Supply Chain Collaboration in Under Eight Weeks"; Jun. 2000; PR Newswire; Trade; Dialog file 16; Accession No. 07456389.
"E-Commerce and the value chain"; Aug. 1999; Electronic Commerce; pp. 157-160.
ProQuest "Logility Announces Voyager XPS; Internet-based Application Assists Companies with Collaborative Planning, Forecasting and Replenishment"; Apr. 1999; PR Newswire; pp. 1-4.
Andrew White, "The Value Equation: Value Chain Management, Collaboration and the Internet"; 1999; Logility, Inc., pp. 1-10.
PCT, Notification of Transmittal of the International Search Report or the Declarations, 5 pages.;Dec. 13, 2001.
"The Value of Chain Management Program", Australian Department of Industry, Science and Resources; www.valuechains.isr.gov.au; Dec. 27, 2001.
"Ariba Unveils Value Chain Management Strategy and Solutions"; Ariba; www.ariba.com; Jan. 31, 2002.
Oros Value Chain Management:; ABC Technologies; www.abctech.com; Jan. 31, 2002.

* cited by examiner

VALUE CHAIN MANAGEMENT

CLAIM OF PRIORITY

This is a divisional application of U.S. patent application Ser. No. 09/941,960, filed on 28 Aug. 2001 and entitled "Value Chain Management", now U.S. Pat. No. 7,349,861, which claims the benefit under 35 U.S.C. §119(e) of U.S. Provisional Application Ser. No. 60/231,650 filed Sep. 11, 2000 entitled "Value Chain Management".

U.S. Pat. No. 7,349,861 and U.S. Provisional Application Ser. No. 60/231,650 are commonly assigned to the assignee of the present application. The disclosure of related U.S. Pat. No. 7,349,861 and U.S. Provisional Application Ser. No. 60/231,650 are hereby incorporated by reference into the present disclosure as if fully set forth herein.

BACKGROUND

1. Technical Field of the Invention

This invention relates generally to the field of business management and more particularly to a system and method for value chain management.

2. Background of the Invention

A value chain represents the flow of a product or service from a raw materials stage to the final point of consumption. Activities that are part of a value chain include the design, production, marketing, sale, delivery, and support of a product or service. The value chain for a typical product includes numerous entities that perform one or more of these activities. However, the typical value chain is plagued by inefficiencies caused by a lack of communication and collaboration by these entities. For example, the enterprises in a value chain typically use serial planning and communication techniques, meaning that only entities that are "adjacent" to one another in the value chain communicate with and plan around each other.

SUMMARY OF THE INVENTION

According to the present invention, disadvantages and problems associated with previous business management systems have been substantially reduced or eliminated.

According to one embodiment of the present invention, a system for managing a value chain includes a planning application that receives planning data from a number of entities included in a value chain and generates a plan according to the planning data. At least two of the entities do not directly communicate planning data to one another. The system also includes a manager application that receives the plan and identifies one or more exceptions in the plan, communicates planning data relating to the exceptions to one or more of the entities, receives instructions from one or more of the entities regarding how the exceptions are to resolved, and modifies the planning data in response to the instructions.

Particular embodiments of the present invention provide one or more technical advantages. For example, certain embodiments of the present invention propagate supply and demand changes throughout the value chain so that each enterprise in the value chain is able to plan based on input from all of the other enterprises (or at least based on input from some "non-adjacent" enterprises in the value chain). In addition, particular embodiments provide visibility into the real constraints of each enterprise in the value chain. Furthermore, certain embodiments provide a framework that allows multiple enterprises to evaluate issues and alternatives in light of the constraints of each of the enterprises and provides for collaboration between the enterprises to increase the efficiency of the value chain. This connectivity between enterprises in the value chain cuts administrative lead times significantly by removing the serial communication of demand and supply information and allows the value chain to become more flexible and be able to fulfill demand efficiently. Moreover, the data of the enterprises may be protected by a security and permissibility framework, thus ensuring that the enterprises' information will be protected from unauthorized entities in or outside of the value chain. Other important technical advantages are readily apparent to those skilled in the art from the figures, descriptions and claims included herein.

BRIEF DESCRIPTION OF THE DRAWINGS

To provide a more complete understanding of the present invention and the features and advantages thereof, reference is made to the following description taken in conjunction with the accompanying drawings, in which.

DETAILED DESCRIPTION OF THE DRAWINGS

Figure 1:
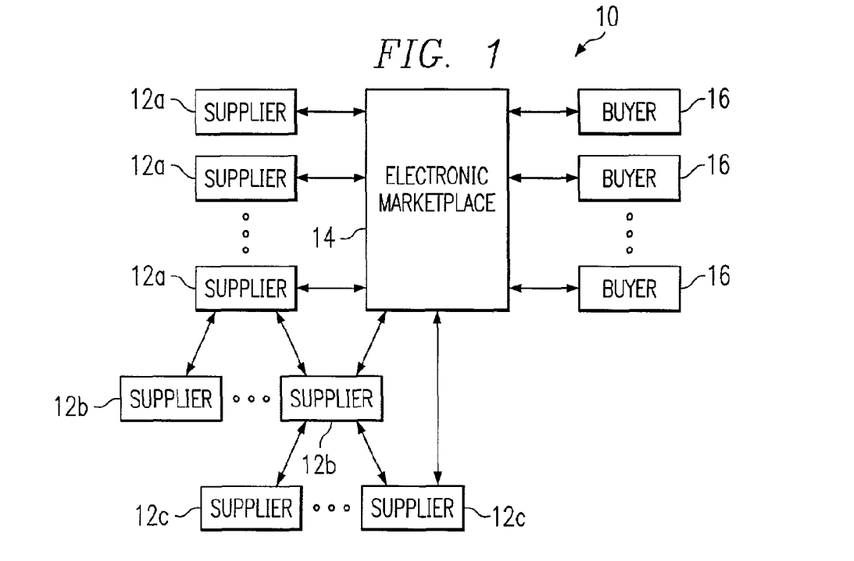
FIG. 1 illustrates an example system for value chain management.

FIG. 1 illustrates an example system 10 for management of a value chain including one or more suppliers 12 and/or buyers 16 of products or other items. Each supplier 12 and buyer 16 may be coupled to a business-to-business (B2B), business-to-consumer (B2C), or other electronic marketplace 14 that links suppliers 12 and buyers 16. As shown, a supplier 12a may be coupled to one or more first tier suppliers 12b which are in turn coupled to one or more second tier suppliers 12c (and any appropriate number of additional tiers of suppliers may also be included). Depending on the nature of marketplace 14, suppliers 12 may include manufacturers such as original equipment manufacturers (OEMs), component manufacturers or suppliers, distributors, wholesalers, retailers, or any other entities that supply items to other suppliers 12 or to buyers 16. The present invention contemplates that multiple suppliers 12 may be associated with the same enterprise, for example, multiple factories, assembly lines, or other entities associated with the same manufacturing enterprise. Furthermore, buyers 16 may each be independent buyers of a product or other item produced by suppliers 12, buyers 16 may be part of the same product delivery stream (for example, distributors, wholesalers, and retailers), or buyers 16 may be any other entities that purchase items from suppliers 12 or other buyers 16.

In general, marketplace 14 brokers pertinent data among suppliers 12 and buyers 16 to propagate demand and supply information between the suppliers 12 and buyers 16. Marketplace 14 also provides planning and collaboration between suppliers 12 and buyers 16 based on this demand and supply information. For example, suppliers 12 and buyers 16 may provide demand information, inventory information, capacity information, manufacturing or transportation lead times, constraint information, and/or alternative resource information to marketplace 14. Marketplace 14 may then make this information available to some or all of suppliers 12 and/or buyers 16 and may use this information for planning and collaboration between suppliers 12 and buyers 16. While this description refers to information sharing, planning, collaboration, and other value chain management activities between suppliers 12 and buyers 16, it should be understood that the present invention is equally applicable to such activities solely between suppliers 12 or solely between buyers 16. Furthermore, although suppliers 12 and buyers 16 are shown as being coupled to marketplace 14, the present invention contemplates suppliers 12 interacting with one another through one or more first marketplaces 14 and suppliers 12 interacting with buyers 16 using one or more second marketplaces 14. For example, first marketplace 14 may be a purely B2B marketplace 14 and second marketplace 14 may be a purely B2C marketplace 14. Moreover, suppliers 12 and buyers 16 may be coupled and collaborate in any other appropriate manner.

Suppliers 12 and buyers 16 may interact with marketplace 14 autonomously or according to input from one or more associated persons. Suppliers 12, marketplace 14, and buyers 16 may be coupled to one another using one or more local area networks (LANs), metropolitan area networks (MANS), wide area networks (WANs), a portion of the global computer network known as the Internet, or any other appropriate wireline, wireless, or other links. Suppliers 12, marketplace 14, and buyers 16 may be arranged and communicate with one another according to a hub-and-spoke, peer-to-peer, or any other suitable architecture. In one embodiment, system 10 is implemented with a hub-and-spoke architecture in which the spokes are suitably integrated with enterprise systems of suppliers 12 and buyers 16 and allow schedule-based data transfer between these enterprise systems and marketplace 14. Suppliers 12, marketplace 14, and buyers 16 may each operate on one or more computer systems at one or more locations. The components of system 10 may share data storage, communications, or other resources according to particular needs.

The use of marketplace 14 for value chain management provides numerous advantages over previous "supply chain" techniques, which have inherent inefficiencies that are caused by a lack of connectivity, timely communication, and visibility between the various enterprises in the value chain. These inefficiencies cause inordinately long customer order lead times, stock times and obsolescing material. Previous supply chain techniques have attempted to achieve targeted order lead times by holding excess inventory at several points in the supply chain. However, this practice typically leads to high inventory costs and even then often does not produce the target lead times. Furthermore, previous techniques typically provide planning between enterprises in serial mode, by taking a decision of one enterprise and transferring the effects of the decision to the next enterprise in the chain. This introduces significant communication and administrative lead times in the planning process. These administrative lead times hinder the flexibility of the supply chain and affect the responsiveness in the operational short-term horizon. Since previous supply chains have operated in a serial manner, most enterprises in the chain typically have no visibility into the root causes of a problem and are not able to take proper remedial actions.

Eliminating or minimizing these inefficiencies allows each enterprise in a value chain to simultaneously lower inventory, improve responsiveness, and lower costs. Additionally, value chain enterprises can collectively understand how relationships and interactions need to be modified in order to achieve or improve on desired objectives, including customer service levels, order lead times, and build-to-order manufacturing. Through the use of marketplace 14, system 10 provides a comprehensive solution that addresses all enterprises in the value chain. For example, by immediately propagating any demand changes to suppliers 12 and/or buyers 16 in the value chain, marketplace 14 reduces administrative lead times significantly and makes the entire value chain more responsive and efficient. Furthermore, marketplace 14 provides suppliers 12 and buyers 16 instant visibility into material and capacity constraints and exceptions across the value chain and provides a decision-support framework to collaboratively resolve these exceptions. For example, marketplace 14 allows for the proper positioning of inventory and capacity across the value chain to resolve a lack of supply in light of a projected demand.

Figure 2:
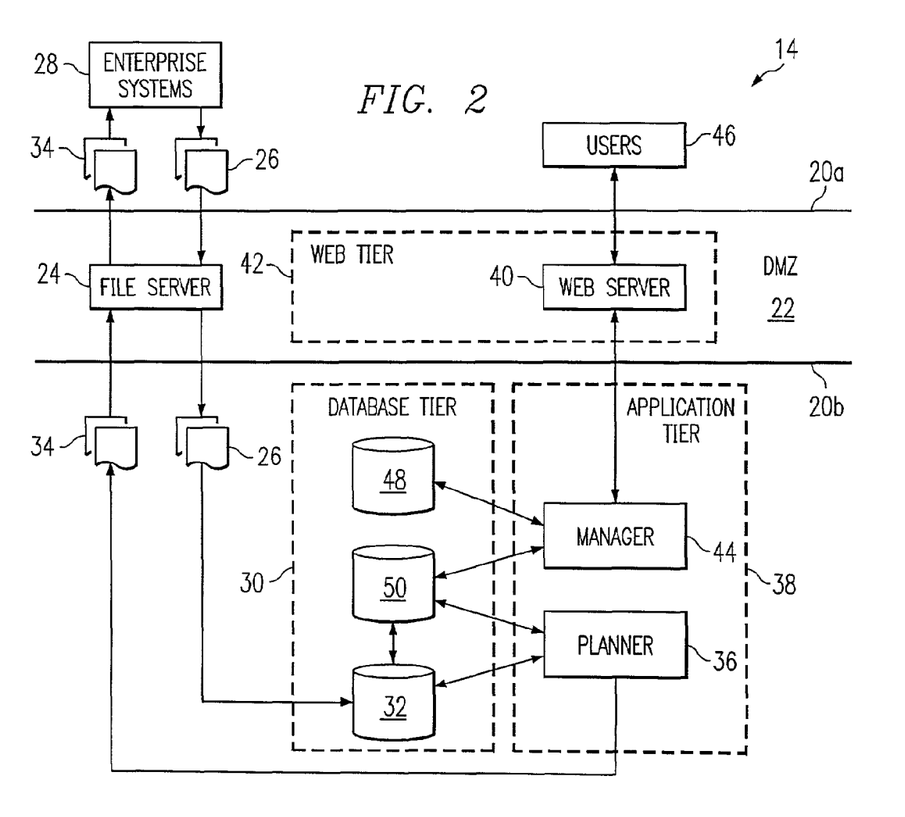
FIG. 2 illustrates an example electronic marketplace providing value chain management.

FIG. 2 illustrates an example marketplace 14, and interactions with suppliers 12 and buyers 16, in more detail. Marketplace 14 may include one or more firewalls 20 establishing a "DMZ" or other region 22 that separates suppliers 12 and buyers 16 (as well as any other entities with access to the network or networks used to couple suppliers 12 and buyers 16 to marketplace 14) from certain processing and data storage resources of marketplace 14. In one embodiment, DMZ 22 includes a file transfer protocol (FTP) or other appropriate file server 24 that receives data files 26 or other information from enterprise systems 28 associated with suppliers 12 and buyers 16 (each supplier 12 and buyer 16 may have one or more computers coupled to marketplace 14 and these computers are collectively referred to as enterprise systems 28). File server 24 communicates the data files 26 to a database tier 30 of marketplace 14 for storage in database 32 in the form of flatfiles or otherwise. File server 24 also receives planning output 34 from one or more appropriate planner applications 36 within an application tier 38 of the marketplace 14, as described below. The file server 24 communicates the planning output 34 to enterprise systems 28 associated with suppliers 12. DMZ 22 also includes one or more web servers 40 within a web tier 42 of the marketplace 14 that communicate between a manager application 44 within application tier 38 and one or more users 46 associated with suppliers 12 and buyers 16. For example, the web server 40 may communicate with users 46 using Hypertext Transfer Protocol (HTTP) documents or Extensible Markup Language (XML) documents contained within Secure Hypertext Transfer Protocol (HTTP-S) communications. Although illustrated as separate components, the functionalities of planner application 36 and manager application 44 may be implemented in a single component or as more than two components.

In one embodiment, the manager application 44 is responsible for managing the flow of data to, from, and within the marketplace 14 in connection with management of supply and demand in the value chain, including the communication of material and capacity constraint data and communication between suppliers 12 and/or buyers 16 to resolve exceptions created by these constraints or by other factors.

Based on data 26 from suppliers 12 and buyers 16, planner application 36 may generate a plan for manufacturing a product or other item or performing another activity in the value chain. This data 26 may be received at file server 24 and stored in database 32. As an example only, planner application 36 may obtain data from a buyer 16 relating to demand for a product, data from a supplier 12a relating to demand for components to create the product and the supply of finished and unfinished product (as well as constraints relating to the manufacture of the product), and data from one or more first tier suppliers 12b relating to the supply of product components and constraints relating to the manufacture of the components. Furthermore, many more tiers of suppliers may be present and any other appropriate type of data may be obtained by planner application 36. Planner application 36 may then use this data to create a plan for acquiring, manufacturing, and/or delivering product and product components to appropriate enterprises.

In a particular embodiment, planner application 36 is a supply chain planning engine which generates planning information for some or all of the value chain based on data files 26 received from enterprise systems 28. In another particular embodiment, planner application 36 is a factory planning engine that generates planning information for at least a portion of a factory and its constituent operations. Planner application 36 may interact with database 32 or, more preferably with respect to certain tasks, with an active data warehouse (ADW) 50 in which the information contained in the data files 26 may be stored and updated.

As conditions change at suppliers 12 and buyers 16, these enterprises may communicate updated data 26 to marketplace 14 to reflect such changes. For example, if a buyer 16 determines that more product is needed, then buyer 16 may communicate updated demand information to marketplace 14. As another example, a supplier 12 may update supply information to reflect a change in the quantity of product or product components that it can manufacture by a particular time or may update constraint information to reflect a change in the supplier's capacity (for example, due to the failure of certain manufacturing resources) or other changes in constraint information. Planner application 36 may obtain this new data 26 and update the plan based on this new information. The plan may be updated as new data is received or on a periodic basis (for example, daily or weekly).

Planner application 36 communicates planning information to manager application 44 or stores the planning information for access by manager application 44 (and may also communicate planning output 24 to enterprise systems 28). The planning information may include and/or identify one or more problems or "exceptions" in the value chain stemming from mismatches in supply and corresponding demand. For example, if a supplier 12b was originally scheduled to supply a quantity of components to a supplier 12a, but can no longer supply the quantity of components, then an exception may be generated indicating the lack of supply and any corresponding problems the lack of supply may created due to this lack of supply (for example, supplier 12a may not be able to meet a buyer's demand). Based on the planning information it receives from the planner application 36, manager application 44 may communicate notifications to appropriate suppliers 12 and/or buyers 16 in the value chain to alert the enterprises of the exceptions. Manager application 44 may receive the planning information directly from planner application 36 or the planning information may be stored in and retrieved by manager application from data storage, such as ADW 50. Furthermore, manager application 44 may analyze the planning information and identify potential problems in the planning information and identify exceptions. Alternatively, the exceptions may be already identified in the planning information by planning application 36.

Based on the exceptions, manager application 44 communicates notifications to appropriate users 46. For example, notifications may be communicated to only the suppliers 12 and/or buyers 16 that the exceptions affect. The notifications may be communicated in any appropriate format. For example, users 46 may be notified using e-mail, pager alerts, or instant messaging. The notification may indicate that there are one or more exceptions that need to be resolved and may also indicate the severity or importance of the exceptions. The importance of an exception may be based on when the exception will adversely affect the value chain (for example, create a lack or excess of supply), a quantification of the adverse affect that the exception may cause (for example, the amount of shortfall or excess of supply), the length of time the exception has been outstanding, and/or any other suitable measures. Furthermore, the notification may be tailored to specific users 46 to indicate whether the exception requires an action by the user 46 or whether the exception merely will affect the enterprise with which user 46 is associated.

When a user 46 receives a notification, user 46 may then communicate with marketplace 14 to identify the exceptions. Alternatively or in addition, user 46 may periodically communicate with marketplace 46 to determine whether there are exceptions or user 46 may be continually connected to marketplace 14 so that user 46 has continuous access to exceptions and other information provided by marketplace 14. User 46 may communicate with marketplace 14 and, more specifically, manager application 44 using web server 40. Web server 40 may provide user interfaces (such as web pages) that allow a user 46 to access and respond to information provided by manager application 44. Users 46 may each have a user name and password that identifies the user 46 and identifies what information a particular user 46 may have access to (based on a permissibility framework). Data communicated between marketplace 14 and users 46 may also be encrypted to prevent unauthorized access to the data.

A user 46 may be provided with any appropriate type and format of information that conveys the exceptions. In particular embodiments, users 46 are provided graphical user interfaces that present supply and demand information for all products and product components in the value chain and may highlight excess or shortfall of supply. The supply and demand information may be presented from the point-of-view of any enterprise in the value chain and user 46 may be limited to particular views and/or information in a view based on the permissibility framework. These same user interfaces may be used to view planning data and identify exceptions, and also for user 46 to enter planning information to be communicated to marketplace 14 (again, the ability to enter and/or change planning data may be based on a permissibility framework).

When a user 46 has discovered an exception identified by manager application 44, user 46 may then attempt to resolve the exception. User 46 may communicate with the enterprise or enterprises involved in the exception and attempt to correct the problem. For example, if the exception indicates that a first tier supplier 12b is not going to meet a demand from a supplier 12a for a particular component due to a failure of a second tier supplier 12c to meet the demand of supplier 12b for a raw material used to manufacture the component, supplier 12a may communicate with another first tier supplier 12b to obtain the shortfall or supplier 12a may communicate with another second tier supplier 12c to ensure that first tier supplier 12b has the necessary raw materials. Supplier 12a may determine that the other first tier supplier 12b or the other second tier supplier 12c has excess supply of the needed component or raw material, respectively, based on information provided by manager application 44, based on communication with these enterprises, or based on any other suitable information: If this information is available through manager application 44, then manager application 44 may also provide the user 46 with the ability (using a user interface) to allocate this excess supply to resolve the shortfall identified by the exception. Alternatively, user 46 may communicate with the appropriate enterprise and arrange for delivery of the needed components or raw material. In this case, the user 46 may then communicate this information to manager application 44.

After a user 46 has determined an appropriate action and communicated information to manager application 44 regarding this action (for example, communicate where supply is to come from to make up for a shortfall), manager application 44 communicates this information to planner application 36. This information may be communicated to planner application 36 directly, stored in ADW 50 for access by planner application 36, or obtained by planner application 36 in any other appropriate manner. Planner application 36 obtains this information and updates the plan based on this information. For example, planner application 36 may identify that a shortfall is being met by another source of supply and remove the exception. Planner application 36 may also generate other exceptions, if appropriate, that the user's action may have caused. The updated planning information, including any new exceptions and the removal of resolved exceptions may then be communicated to ADW 50 such that manager application 44 may present the updated information to users 46, if appropriate.

Figure 3:
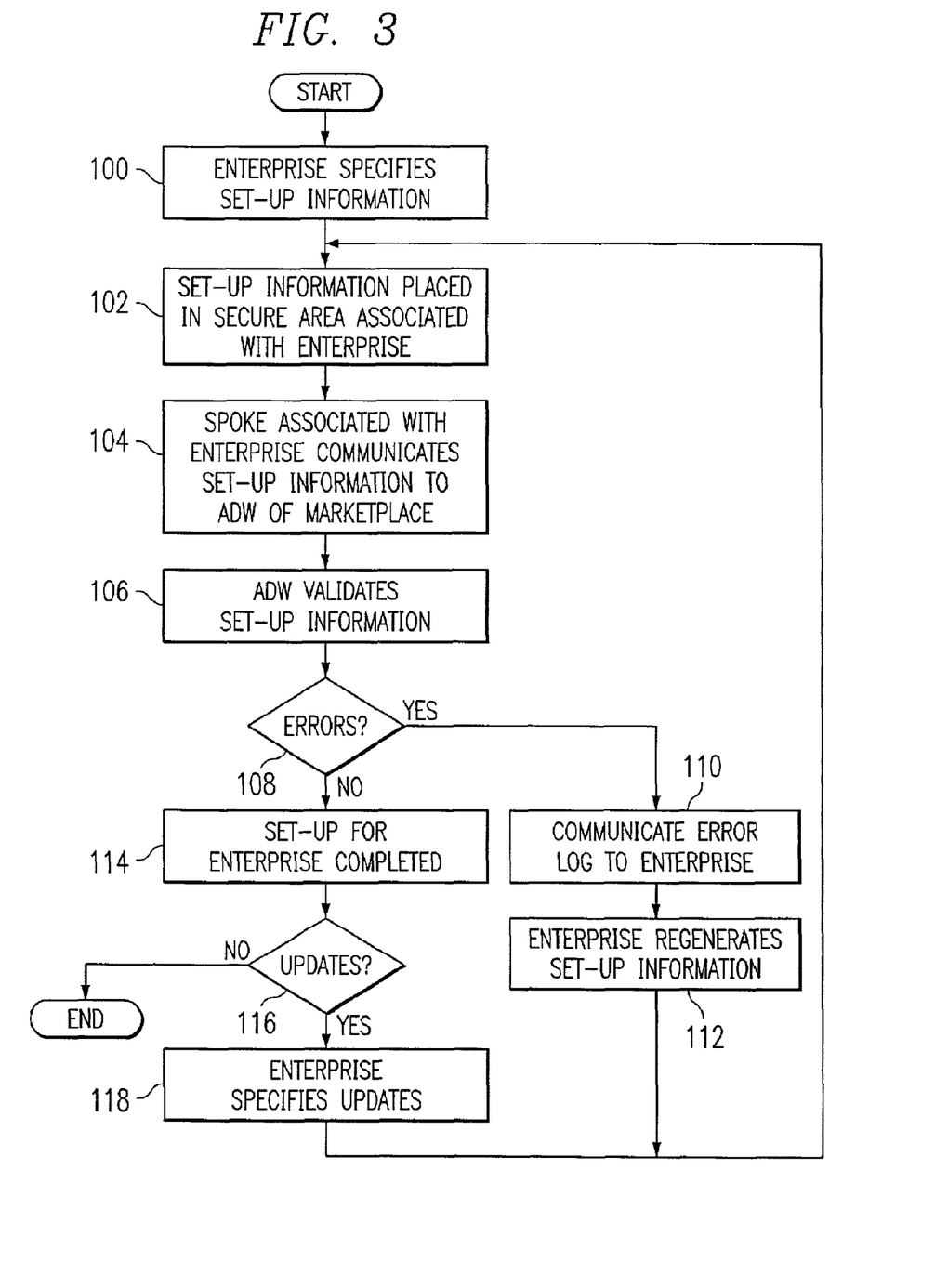
FIG. 3 illustrates an example method of setting up a system for value chain management.

FIG. 3 illustrates an example method of setting up marketplace 14 for management of a value chain including one or more suppliers 12 and/or buyers 16. The method begins at step 100, where one or more suppliers 12 and/or buyers 16 in the value chain specify set-up information for the value chain to be managed. The set-up information provides marketplace 14 with information regarding the make-up and characteristics of the value chain so that marketplace 14 may be used to manage the value chain. As an example, where supplier 12a is an OEM, this set-up information may include: products, product components, or other items included in the value chain to be managed; any other suppliers 12a that are known to supply or procure the items; any first tier suppliers 12b known to supply the items to supplier 12a; any buyers 16 known to procure the items; information relating to any contracts that might exist between supplier 12a and other suppliers 12a, first tier suppliers 12b, or buyers 16; any other suitable sourcing data; communications information to allow the enterprise systems 28 of supplier 12a to communicate data files 26 to and receive planning output 34 from marketplace 14; one or more capacity trees and/or other capacity information; one or more bills of materials (BOMs) identifying the constituent components of a product or other item supplied by supplier 12a; suitable mappings between the items supplied to or procured from supplier 12a and items supplied by or procured by, respectively, other entities; and any other suitable set-up information.

For first tier supplier 12b, the set-up information may provide: items which supplier 12b contributes to the value chain; any other suppliers 12b known to supply or procure the items; any second tier suppliers 12c known to supply the items to supplier 12b; any suppliers 12a known to procure the items; information concerning any contracts that may exist between the supplier 12b and other suppliers 12b, second tier suppliers 12c or suppliers 12a; any other sourcing data; communications information to allow enterprise systems 28 of supplier 12b to communicate data files 26 to and receive planning output 34 from marketplace 14; one or more capacity trees and/or other capacity information; one or more BOMs identifying the constituent components of a product or other item supplied by supplier 12b; mappings between the items supplied to or procured from supplier 12b and the items supplied or procured by, respectively, other entities; and any other appropriate set-up information.

Similarly, for a second tier supplier 12c, set-up information may provide: items for which capacity extremes at supplier 12c are to be managed; any other suppliers 12c known to supply or procure the items; any third tier suppliers known to supply the items to supplier 12c; any suppliers 12b being known to procure the items; information concerning any contracts that may exist between supplier 12c and other suppliers 12c, third tier suppliers or second tier suppliers 12b; other appropriate sourcing data; communications information to allow the enterprise systems 28 of the supplier 12c to communicate data files 26 to and receive planning output 34 from marketplace 14; one or more capacity trees and/or other capacity information; one or more BOMs; mappings between the items supplied to or procured from the supplier 12c and those items supplied by or procured by, respectively, other entities; and any other appropriate set-up information. Analogous set-up information may be specified for third and lower tiered suppliers 12, buyers 16, and/or for any other entity within system 10 that is coupled to marketplace 14.

At step 102, the set-up information for each enterprise in the value chain is placed in a specified data storage location associated with the enterprise, such as behind a firewall that secures this information against unauthorized access. In a particular embodiment, at step 104, a spoke application or other communication component associated with each enterprise picks up the set-up information and communicates it over the Internet or otherwise for storage in database 32 and/or ADW 50. The enterprises may assist in communicating set-up information to marketplace 14, particularly the first time set-up information is communicated for the particular enterprise. Thereafter, updated set-up information may be automatically communicated by the spoke application from the enterprise to marketplace 14 on a scheduled basis and/or when the spoke application identifies new data in the specified data storage location associated with a particular enterprise.

At step 106, ADW 50 may validate one or more aspects of the set-up information. If errors exist at step 108, an error log is generated and communicated to the appropriate enterprise at step 110. In one embodiment, the error log is placed in a specified data storage location associated with the enterprise, such as behind a firewall that secures this information against unauthorized access. At step 112, the enterprise or an associated user 46 accesses the error log, makes appropriate corrections, and regenerates some or all of the set-up information for the enterprise. The method then returns to step 102. If no errors exist at step 108, then set-up is complete for the enterprise at step 114.

If updates to the set-up information are warranted at step 116, the enterprise or an associated user 46 specifies the updates at step 118 and the method then returns to step 102. The present invention contemplates updating set-up information for an enterprise periodically, according to an appropriate schedule, or on an "as-needed" basis, as long as the enterprise is associated with the marketplace 14. If the enterprise disassociates from the marketplace 14 such that no updates occur at step 116, the method ends. The present invention contemplates the method being performed analogously, for each enterprise or other entity that uses marketplace 14 for management of a value chain for one or more items.

Figure 4:
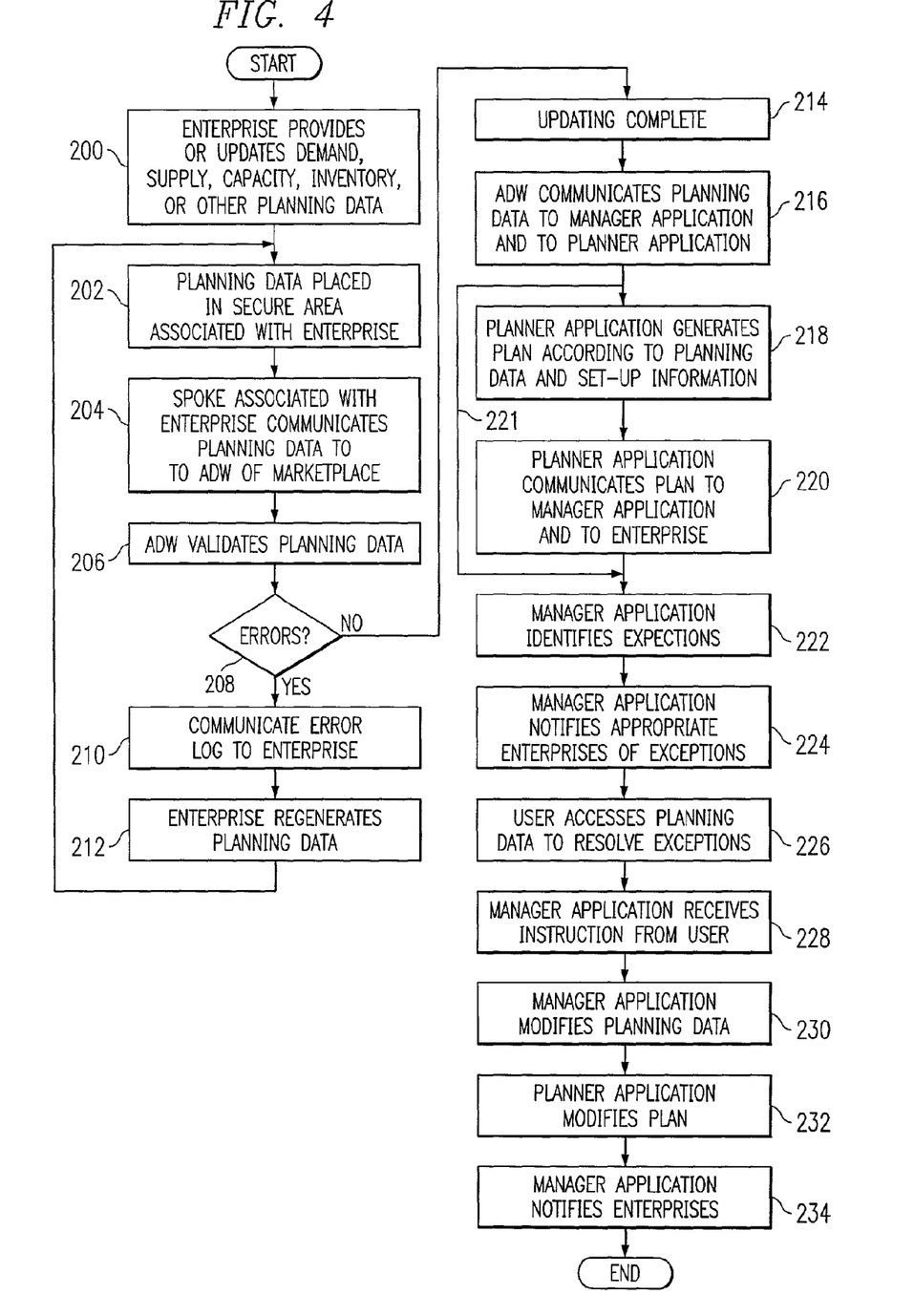
FIG. 4 illustrates an example method of managing a value chain using an electronic marketplace.

FIG. 4 illustrates an example method of managing a value chain using marketplace 14. Although suppliers 12 and buyers 16 and their associated value chain are primarily described, as noted above the present invention contemplates planning for any suitable collection of entities, such as multiple factories of a single enterprise or multiple operations within a single factory. The method begins at step 200, where one or more enterprises participating in the value chain, such as buyers 16, suppliers 12a and hierarchically related suppliers 12b and 12c, provide or update previously provided supply, demand, capacity, inventory, and/or other suitable planning data using associated enterprise systems 28. As an example, where supplier 12 is an OEM, supplier 12 may update its demand and inventory planning data to reflect an excess or shortage at supplier 12. One or more associated first tier, second tier, and lower tier suppliers 12 and/or buyers 16 may similarly update their demand, supply, capacity, and/or inventory planning data. These updates may occur on a scheduled basis, serially, substantially simultaneously, or in any other appropriate manner. In one embodiment, all enterprises update associated planning data according to a predetermined schedule designed to help ensure that the marketplace 14 is not operating on stale data while not imposing an unduly large burden on enterprise systems 28, users 46, or any other aspects of suppliers 12.

At step 202, the planning data for each enterprise is placed in a specified data storage location associated with the enterprise, such as behind a firewall that protects the information against unauthorized access. In one embodiment, at step 204, the spoke associated with each enterprise picks up the planning data and communicates it over the Internet or otherwise to ADW 50 of marketplace 14. Although scheduled automatic communication of the planning data is preferable, user 46 may assist in communicating the planning data to marketplace 14 as appropriate. At step 206, ADW 50 may validate one or more appropriate aspects of the planning data. If errors exist at step 208, an error log is generated and communicated to the appropriate enterprise at step 210. In one embodiment, the error log is placed in a specified data storage location associated with the enterprise, such as behind a firewall that secures the information from unauthorized access. At step 212, the enterprise or ail associated user 46 accesses the error log, makes suitable corrections, and regenerates some or all status information for the enterprise. The method then returns to step 102. If no errors exist at step 208, then updating of the planning data is complete for the enterprise at step 214.

At step 216, ADW 50 communicates the planning data for one or more enterprise to planner application 36 and, possibly, to manager application 44 (or applications 36 and 44 may access to ADW 50 to obtain this data). Based on the planning data and an appropriate model for at least the portion of the value chain (supplied, at least in part, through the set-up information described above), planner application 36 generates a plan at step 218 (or an updated plan if a plan has already been generated and the planning data is updated planning data). Planner application 36 may update the plan whenever planning data or set-up information is changed by an enterprise or on a periodic basis (if such data or information has changed since the last plan update). The plan may identify exceptions that have occurred based on the planning data due to a change in planning data. For example, if demand for a product may no longer be met because of a change in the supply of a component of the product, this exception may be identified in the plan using any appropriate technique. Planner application 36 communicates the plan to manager application 44 and to enterprise systems 28 at step 220. In response, at step 222, manager application 44 identifies one or more exceptions in the plan. As described above, these exceptions may be designated in the plan by planning application 36. Manager application 44 may also or alternatively analyze the plan and identify appropriate exceptions.

Furthermore, instead of or in addition to planner application 36 generating a plan at step 218 in response to updated planning information and communicating the plan to manager application 44 at step 220, manager application 44 may receive the planning information at step 216 and identify exceptions caused by the planning information. For example, manager application 44 may identify that a change in supply from a supplier 12 may create a problem and thus manager application 44 may generate an exception. Furthermore, manager application 44 may generate exceptions based on any other appropriate algorithms and/or rules. Such algorithms and rules may be specified or selected by a user 46 as appropriate for a particular value chain. In particular embodiments, planning application 36 only generates a plan on a periodic or "batch" basis (for example, daily or weekly). In such embodiments, planning application 36 may perform steps 218 and 220 on this batch basis. During other times, steps 218 and 220 are not performed and manager application 44 identifies exceptions potentially created by updated planning data on a "real-time" basis at step 222 as updated planning data is received (as indicated by arrow 221).

At step 224, manager application 44 notifies appropriate enterprises of the one or more exceptions identified at step 222. Manager application 44 may communicate the notification to a user 46 associated with each enterprise in the value chain, only to users 46 associated with enterprises affected by the exception(s), or only to users 46 associated with enterprises that have the ability to take corrective action to resolve the exception(s), as appropriate. As described above, the notifications may be made using e-mail, pager alerts, or using any other appropriate technique. In response to the notification, a user may access at step 226 the plan or planning data as appropriate to resolve the exceptions. As described above, the user 46 may log into marketplace 14 using web server 40 or may gain access to the planning data in any other appropriate manner. Furthermore, in particular embodiments and for particular exceptions, manager application 44 may communicate an exception and the planning information associated with the exception to one or more users 46 to resolve (so that the users 46 do not have to log into marketplace 14 to access the information). In addition or alternatively, one or more users 46 may periodically access marketplace 14 and resolve exceptions without a notification being communicated to the users 46 by manager application 44. As described above, when a user 46 accesses marketplace 14, manager application may provide the user 46 with one or more user interfaces that allow the user to view the plan and/or planning data and to manipulate the data. For example, a shortfall in the supply of a component may be identified graphically so that the exception caused by this shortfall may be identified by a user 46.

At step 228, manager application 44 receives instructions for resolving or otherwise responding to one or more exceptions from one or more users 46. As an example only, if a first supplier 12 is unable to supply a particular number of promised components, then a user 46 may indicate a second supplier 12 from which the components are to be obtained. The user 46 may know that the second supplier 12 has an excess of the needed component based on the planning data provided by the second supplier 12. The user 46 may alternatively confirm that the shortfall is acceptable or communicate any other appropriate instructions. At step 230, manager application 44 modifies, if appropriate, the planning data stored in ADW 50 or other appropriate data storage location in response to the instructions from the user 46. If particular embodiments, manager application 44 may request confirmation from users 46 associated with enterprises affected by the modification (for example, the second supplier 12 in the example above) before making the modification. Planner application 36 accesses the modified planning data at step 232 and updates the plan based on the modified planning data, and the method ends. As described above, planner application 36 may perform this updating as-need or on a periodic basis. The example method may be repeated whenever one or more enterprises update planning data.

Although the present invention has been described with several embodiments, numerous changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A system for managing a value chain, comprising:
a computer system, comprising:
a planning application tangibly embodied on a computer-readable medium and configured to receive planning data from a plurality of entities included in a value chain and to automatically generate a plan according to the planning data, at least two of the entities not directly communicating planning data to one another; and
a manager application tangibly embodied on a computer-readable medium and configured to:
receive the plan and automatically identify one or more exceptions in the plan;
communicate planning data relating to the exceptions to one or more of the entities;
receive instructions from one or more of the entities regarding how the exceptions are to be resolved; and
automatically modify the planning data in response to the instructions.

2. The system of claim 1, wherein:
the planning application is further configured to automatically generate an updated plan according to the planning data modified by the manager application; and
the manager application is further configured to communicate the updated plan to the entities in the value chain.

3. The system of claim 1, wherein the manager application is further configured to:
receive updated planning data from one or more of the entities; and
automatically identify potential exceptions that may be caused by the updated planning data without receiving an updated plan from the planning application.

4. The system of claim 1, wherein the manager application is further configured to:
automatically communicate a notification regarding the existence of an exception to one or more of the entities;
receive a request for information about the exception from one or more of the entities in response to the notification;
automatically communicate planning data relating to the exception to one or more of the entities in response to receiving the request.

5. The system of claim 1, wherein the manager application is further configured to control access to the planning information based on a permissibility framework.

6. The system of claim 1, wherein the planning application comprises a supply chain planning engine, the plurality of entities comprise enterprises, and the plan comprises a supply chain plan for at least a portion of a supply chain including the enterprises.

7. A computer-implemented method of managing a value chain, comprising:
receiving, using a computer, planning data from a plurality of entities included in a value chain, at least two of the entities not directly communicating planning data to one another;
automatically generating, using the computer, a plan according to the planning data;
automatically identifying, using the computer, one or more exceptions in the plan;
communicating, using the computer, planning data relating to the exceptions to one or more of the entities;
receiving, using the computer, instructions from one or more of the entities regarding how the exceptions are to be resolved; and
automatically modifying, using the computer, the planning data in response to the instructions.

8. The method of claim 7, further comprising:
automatically generating an updated plan according to the modified planning data; and
communicating the updated plan to the entities in the value chain.

9. The method of claim 7, further comprising:
receiving updated planning data from one or more of the entities; and
automatically identifying potential exceptions that may be caused by the updated planning data without updating the plan according to the updated planning data.

10. The method of claim 7, further comprising:
automatically communicating a notification regarding the existence of an exception to one or more of the entities;
receiving a request for information about the exception from one or more of the entities in response to the notification;
automatically communicating planning data relating to the exception to one or more of the entities in response to receiving the request.

11. The method of claim 7, further comprising controlling access to the planning information based on a permissibility framework.

12. The method of claim 7, further comprising:
receiving set-up information from one or more of the entities, the set-up information including characteristics of the value chain; and
automatically generating the plan according to the planning data and the set-up information.

13. A non-transitory computer-readable medium embodied with software for managing a value chain, the software when executed using one or more computers is configured to:
receive planning data from a plurality of entities included in a value chain, at least two of the entities not directly communicating planning data to one another;
automatically generate a plan according to the planning data;
automatically identify one or more exceptions in the plan;
communicate planning data relating to the exceptions to one or more of the entities;
receive instructions from one or more of the entities regarding how the exceptions are to be resolved; and
automatically modify the planning data in response to the instructions.

14. The computer-readable medium of claim 13, further operable to:
automatically generate an updated plan according to the modified planning data; and
communicate the updated plan to the entities in the value chain.

15. The computer-readable medium of claim 13, further operable to:
receive updated planning data from one or more of the entities; and
automatically identify potential exceptions that may be caused by the updated planning data without updating the plan according to the updated planning data.

16. The computer-readable medium of claim 13, further operable to:

automatically communicate a notification regarding the existence of an exception to one or more of the entities;
receive a request for information about the exception from one or more of the entities in response to the notification;
automatically communicate planning data relating to the exception to one or more of the entities in response to receiving the request.

17. The computer-readable medium of claim 13, further operable to control access to the planning information based on a permissibility framework.

18. The computer-readable medium of claim 13, further operable to:
receive set-up information from one or more of the entities, the set-up information including characteristics of the value chain; and
automatically generate the plan according to the planning data and the set-up information.

19. A computer-implemented method of managing a value chain, comprising:
receiving, using a computer, planning data from a plurality of entities included in a value chain, at least two of the entities not directly communicating planning data to one another;
receiving, using the computer, set-up information from one or more of the entities, the set-up information including characteristics of the value chain;
automatically generating, using the computer, a plan according to the planning data;
receiving, using the computer, the plan and automatically identifying one or more exceptions in the plan;
automatically communicating, using the computer, a notification regarding the existence of an exception to one or more of the entities;
receiving, using the computer, a request for information about the exception from one or more of the entities in response to the notification;
automatically communicating, using the computer, planning data relating to the exception to one or more of the entities in response to receiving the request, access to the planning information being based on a permissibility framework;
receiving, using the computer, instructions from one or more of the entities regarding how the exceptions are to resolved; and
automatically modifying, using the computer, the planning data in response to the instructions.

20. A non-transitory computer-readable medium embodied with software for managing a value chain, the software when executed using one or more computers is configured to:
receive planning data from a plurality of entities included in a value chain, at least two of the entities not directly communicating planning data to one another;
receive set-up information from one or more of the entities, the set-up information including characteristics of the value chain;
automatically generate a plan according to the planning data;
receive the plan and automatically identify one or more exceptions in the plan; automatically communicate a notification regarding the existence of an exception to one or more of the entities;
receive a request for information about the exception from one or more of the entities in response to the notification;
automatically communicate planning data relating to the exception to one or more of the entities in response to receiving the request, the manager application controlling access to the planning information based on a permissibility framework;
receive instructions from one or more of the entities regarding how the exceptions are to resolved; and
automatically modify the planning data in response to the instructions.

\* \* \* \* \*